(12) United States Patent
Hunter et al.

(10) Patent No.: US 7,370,050 B2
(45) Date of Patent: May 6, 2008

(54) DISCOVERABILITY AND ENUMERATION MECHANISMS IN A HIERARCHICALLY SECURE STORAGE SYSTEM

(75) Inventors: Jason T. Hunter, Redmond, WA (US); Simon Skaria, Sammamish, WA (US); Kedarnath A. Dubhashi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 11/168,589

(22) Filed: Jun. 28, 2005

(65) Prior Publication Data
US 2006/0195449 A1 Aug. 31, 2006

Related U.S. Application Data

(60) Provisional application No. 60/657,536, filed on Feb. 28, 2005.

(51) Int. Cl.
*G06F 17/30* (2006.01)
(52) U.S. Cl. .............................. 707/9; 707/3
(58) Field of Classification Search .................... 707/9, 707/3
See application file for complete search history.

(56) References Cited

U.S. PATENT DOCUMENTS

| | | | |
|---|---|---|---|
| 7,111,321 B1 * | 9/2006 | Watts et al. | 726/2 |
| 2003/0188198 A1 * | 10/2003 | Holdsworth et al. | 713/201 |
| 2004/0044655 A1 * | 3/2004 | Cotner et al. | 707/3 |
| 2005/0070276 A1 * | 3/2005 | McGarry | 455/432.2 |
| 2005/0138393 A1 * | 6/2005 | Challener et al. | 713/186 |
| 2006/0005036 A1 * | 1/2006 | Hu et al. | 713/182 |
| 2006/0048209 A1 * | 3/2006 | Shelest et al. | 726/1 |

* cited by examiner

*Primary Examiner*—Apu Mofiz
*Assistant Examiner*—Cindy Nguyen
(74) *Attorney, Agent, or Firm*—Amin, Turocy & Calvin LLP

(57) ABSTRACT

A system that generates a per user abstraction of a store from a connection point. Filtering a view set of a hierarchically secured containment hierarchy based on the access permissions of the principal is one of the novel features of the invention. The invention can offer a collection of primitives that can operate on this aggregation that span multiple container hierarchies with potentially heterogeneous security descriptors. The model can reduce the necessity to traverse the container hierarchy to discover all the accessible items in a domain.

16 Claims, 9 Drawing Sheets

DISCOVERABILITY AND ENUMERATION MECHANISMS IN A HIERARCHICALLY SECURE STORAGE SYSTEM

CROSS-REFERENCE TO RELATED APPLICATIONS

This application claims the benefit of U.S. Provisional Patent application Ser. No. 60/657,536 entitled "DISCOVERABILITY AND ENUMERATION MECHANISMS IN A HIERARCHICALLY SECURE STORAGE SYSTEM" and filed Feb. 28, 2005. The entirety of the above-noted application is incorporated by reference herein.

BACKGROUND

Storage systems traditionally use a containment hierarchy to organize units of storage. In accordance with these systems, a container and therefore, inherently the units of data maintained within the container, are independently securable to facilitate the provisioning of access to the principals. Conventional systems offer discoverability through traversal that could limit access to data upon encountering a container that is not accessible to the principal.

These systems suffer from at least the following limitations. One limitation is that a principal cannot visualize the global set of data for which they have access. In other words, upon rendering a global set of data, if a container is encountered whereby a user does not have access, the contents (e.g., units of data) of this container could not be rendered. Consider a situation where a sub-folder or sub-container exists within a container with access restrictions placed upon the principal. In this scenario, the principal could not visualize (e.g., discover) or access the contents of the sub-folder even if adequate permissions are in place. This restrictive discoverablity is due to lack of adequate permissions to access the parent folder.

Another limitation of traditional systems is that a principal cannot operate on all the data at once. For example, a restriction for an operation such as "grant access to FABRIKAM\alice for all data in the tree-like structure rooted at a given node" would not be possible as restrictions may be in place that would limit access to some of the data in the tree-like structure. In some traditional systems, such operation is effected in the user context and rather than a system context.

Yet another limitation of some conventional systems is that accessing data requires adequate permissions in place for all of the containers from the point of connection to the immediate parent of the unit of data in addition to access permissions on the unit of storage. In other words, in some systems, even if the direct file path of the data is known, permission to access the data may be restricted if access permissions do not exist from the point of connection to the immediate parent where the data is stored.

Still another limitation is that, for effective enumeration on the existing file system model, traditional storage systems distinguish between data and metadata. For rich end-user types, this separation creates difficulty to recognize the distinction between metadata and data.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system that generates a per user abstraction of a store from a connection point. This abstraction can facilitate discoverability of data maintained in a hierarchically secure storage system in accordance with applicable permissions. Filtering a view set from of a hierarchically secured containment structure based on the access permissions of the principal is one of the novel features of the invention. The invention can offer a collection of primitives that can operate on this aggregation that span multiple container hierarchies with potentially heterogeneous security policies (e.g., security descriptors). The model can reduce the necessity to traverse the container hierarchy to discover all the read-accessible items in a domain.

In yet another aspect, an artificial intelligence (AI) component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
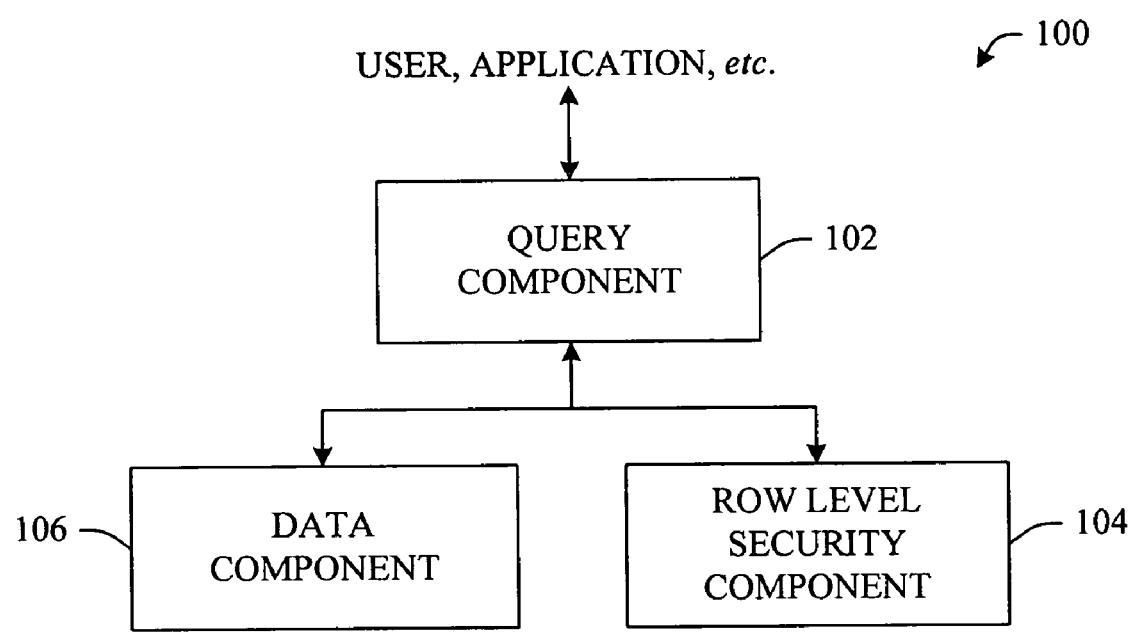
FIG. 1 illustrates a general component block diagram of a system that facilitates discoverability of data in a hierarchical secure storage system in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Aspects of this invention are related to computer systems and more particularly to the discoverability of data maintained in a hierarchically secure storage system(s). As described supra, traditional storage systems have limitations with regard to security-related discoverability mechanisms. To this end, emerging database-oriented file systems can support rich querying and provide schematized end user types for common data units (e.g., contacts). These schematized end-user types facilitate and can enhance the interoperability of applications with respect to data.

The subject invention takes into account a hierarchical representation of data. More particularly, this invention takes into account that data can be "bucketized" into different folders and thereafter placed into different containers. Users can employ these containers to organize their data. For example, data can be organized (e.g., bucketized) into categories such as pictures, music, documents, etc. Additionally, these categories can be further organized into containers thereby establishing a hierarchical representation of the data. By way of example, within pictures, there could be pictures of "my family", "my vacation", "my wedding", etc. As well, sub-categories can exist in accordance with the hierarchy.

In accordance with this hierarchical representation, the invention can facilitate associating a security policy (e.g., security descriptor) with each object. It will be appreciated that an object can be any data element contained within a container as well as the container itself. As well, each object can be represented in an individual row of a table. This row-based representation will be better understood upon a discussion of the figures that follow.

In an aspect, the security descriptor can enable the provisioning of these objects for data access. By way of example, in accordance with an aspect of the invention, a security policy can facilitate setting a "my vacations" folder to permit access by anyone in a group, "my family." As well, within "my vacations" a user can further limit access to certain members of "my family" to access a subfolder (e.g., "my trip to Seattle").

In accordance with conventional systems, accessible exploration of a data store ends at any point when a folder is reached for which the user does not have enumeration access. Consider a hierarchy where F1 contains F2 which contains F3—the moment that the user reaches F2 where no permission is granted, the user will not have the ability to view data within F3. Even though the user may have access to F3, conventional systems will prohibit discoverability because F3 is contained within F2 for which permissions are not in place—this is a limitation. The subject invention enables a user to have uniform access to explore (e.g., discover) and/or render thereby allowing employment of all data in a data store whereby permissions are granted and in place. As described supra, this uniform access can be facilitated via a security policy associated with each object in a data store. As will be understood, each security policy can be associated to a row-level item.

Traditional file systems employ two access modes to retrieve files. First, these systems facilitate a limited discovery method whereby a user can discover data elements for which adequate security permissions exist. The other is a direct access mechanism whereby a user can access a file if the full path is known and permission to access is in place.

In addition to the two disparate modes, the subject invention can employ a third mode which is a query mode (e.g., data store filtering) that allows access and discovery based upon security credentials. Unlike traditional systems, the subject invention can provide a mechanism to query all data based upon a defined specified property as well as to operate on that data. With this invention, so long as access credentials are in place, the data can be discovered and operated on as desired.

In accordance therewith, the subject invention can enable a security policy (e.g., security descriptor) that can be set in the root of a tree-like structure (e.g., hierarchical data organization) and propagated through the tree-like structure to all of the children in the structure. It is to be understood that the propagated security descriptor can be based upon the parent security policy, child security policy, and/or the type of the object. Logic can be employed that effects generating and propagating a security policy throughout a tree-like structure. As will be described infra, rules-based logic and/or artificial intelligence can be employed to propagate a security policy.

Consider a scenario where a user creates a new item. In this scenario, there would be certain security policies (e.g., descriptors) of the parent that can be inherited or combined into the child. In one aspect, a user can have a folder (e.g., container) with permissions and when an object is created, the permissions for the object can be assumed to be the same. Alternatively, the permissions propagated to the newly created object can be intelligently determined based on both the permissions for the folder as well as permissions for the object. The preceding are examples of inheritance in accordance with aspects of the novel innovation.

It will be appreciated that, in traditional file systems, this propagation is not possible. Rather, to change permissions in accordance with conventional systems, an administrator must walk through each child of a tree-like structure and change the permissions as applicable. To the contrary, in accordance with aspects of this invention, when a root permission is changed (or established), the permission can automatically be propagated to all of the tree-like structure, including children.

It is important to note that, in some traditional systems, security permissions could only be propagated in the "user's context" at the time of the update. Although there are situations where permissions can change at a later time, conventional systems cannot automatically update these permissions.

The subject invention can propagate permissions in the "system's context." Therefore, even if a user does not have permission to an intervening folder, if permissions are in place for a sub, sub-sub, etc. tree-like structure, these permissions can be propagated in accordance with the invention. This aspect will be better understood by considering the aforementioned F1, F2 and F3 example.

Continuing with the example, even if permissions are not in place for F2, if permissions exist for F3, permissions can be propagated from F1 to F3. Unlike earlier file systems that distinguish between attributes (e.g., name of the file, size, date created) and data (e.g., content of the file), in rich data systems it is difficult to determine between an attribute and data. As such, "items" were created and are used to grant access permissions on a per "item" basis regardless of the data element being an attribute or data. Accordingly, with respect to the subject invention, management of the security model can particularly be simplified since the system does not have to keep track of two separate security permissions. Rather, in one aspect, only one "read" or only one "write" permission is employed per item rather than employing two "read" permissions and two "write" permissions per item.

As a result, the invention can facilitate a user to view an abstraction of all of the data for which permissions are in place. These views can be defined over the entire store and subsequently rendered to a user. The view can be defined as an intersection of the items visible from a connection point and the set of security permissions allowed. As a result, a user can view and/or access items below a connection point for which the user has security permissions to view and/or access.

Referring initially to FIG. 1, a system 100 that facilitates rendering a representation of content of file store is shown. Generally, system 100 can include a query component 102 and a row-level security component 104. In operation, the query component 102, together with the row-level security component 104 can identify items within a data component 106 that satisfy a security policy or permission. Once identified, the resultant set of data can be rendered to a user and/or application. For example, as previously described, the invention can render the resultant set via a display to a user.

Figure 2:
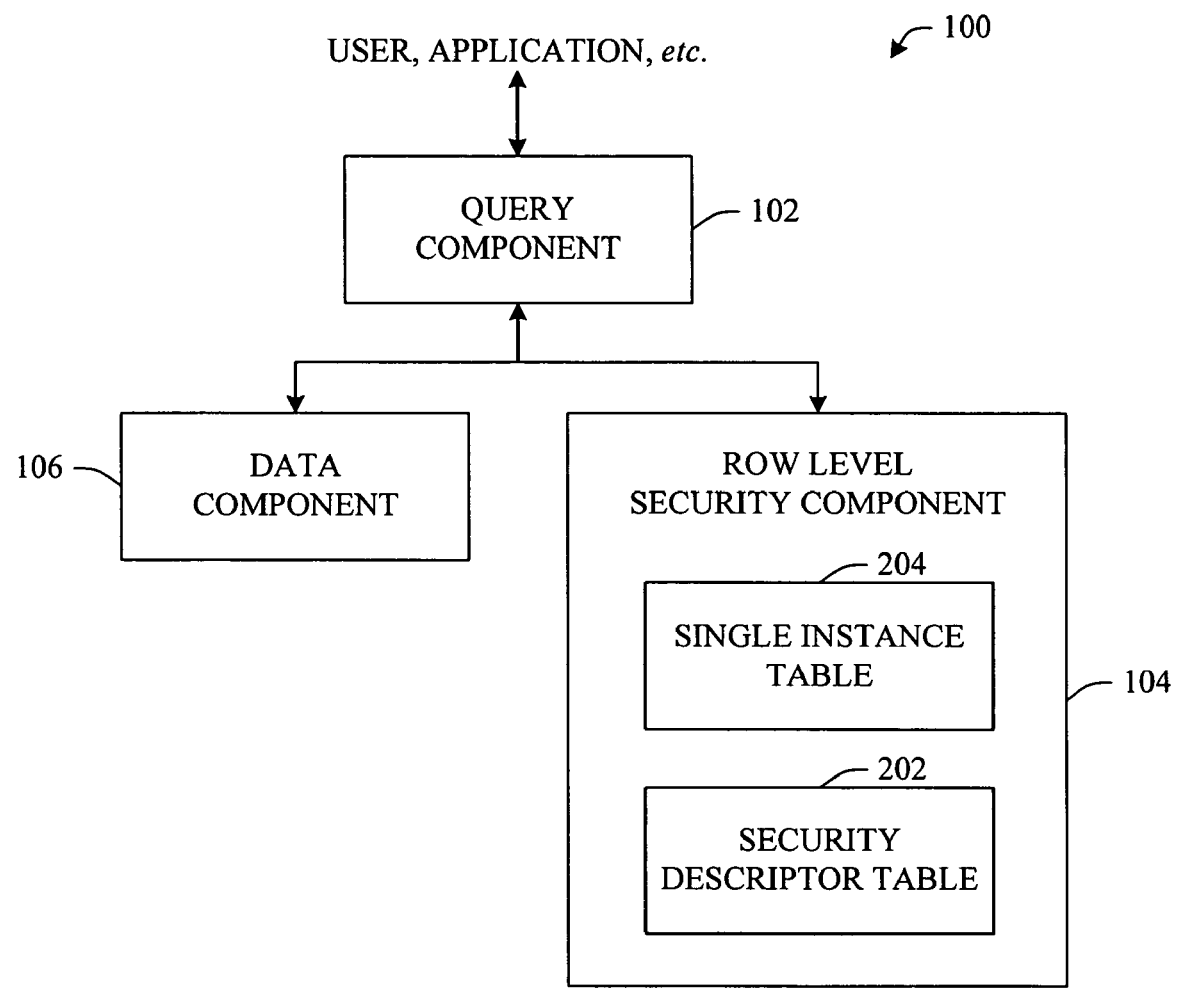
FIG. 2 illustrates a block diagram of a system that includes a single instance table and a security descriptor table in accordance with an aspect of the invention.

With reference now to FIG. 2, a more detailed block diagram of the row-level security component 104 is shown. In particular, the row-level security component 104 can include a security descriptor table 202 and a single instance table 204. Each of these tables will be described in greater detail infra.

The security component 104 can provide a realization of row level security. When the user connects to a share (e.g., data component 106), implicit view definitions for each of the data types can be defined within the scope the connection. In order to add context to the invention, below is an exemplary view definition for a "Contact" type.

```
CREATE VIEW [System.Storage.Contacts.Store].[Contact] AS
    SELECT ItemId, TypeId, NamespaceName, ContainerId,
ItemSyncMetadata,
        TREAT(Item AS [System.Storage.Contacts.Store].[Contact]) AS
Item, PathHandle,
        EntityState, ObjectSize, ChangeInformation, PromotionStatus
    FROM [System.Storage.Store].[Table!Item]
    WHERE Item IS OF ([System.Storage.Contacts.Store].[Contact])
        AND (@@ITEM_DOMAIN_IS_ROOT = 1
        OR (PathHandle >= @@ITEM_DOMAIN AND PathHandle <
@@ITEM_DOMAIN_LIMIT))
```

Each item is stored as a row in the entity tables (202, 204). The above exemplary expression can effect filtering out the Contact types from the global scope of items in the store. Implicit to this filtering is the dimension of access control where a user would see only those items that are readable according to the security descriptors in the corresponding row.

In this example, a view definition can include the above-identified "WHERE" clause that restricts a view to items that are Contacts. The remainder of the example can restrict access to items from the connection point. It is to be understood that the view definition above does not include the security definition.

As described above, the security mechanism is a function of the row level security stored in tables (202, 204). This mechanism is applied at the underlying table level of the view and has propagating effects on the view. When security is enabled on a per row basis, the rows for which a user does not have read access do not appear in the resultant set provided by the query component 102.

In a file system model, each "item" is in a row, and each row has security associated with it. The row level security mechanism 104 restricts the rows from appearing in the results for those rows that a user does not have read access. The view, given a definition conveyed to the query component 102, (as in the above example) can restrict the rendering (e.g., viewing) based at least in part upon the connection point. Therefore, the resultant set, can be the intersection of these two restrictions. It will be appreciated that these security mechanisms can occur implicit to the query definition. As a result, the user can be shielded from any of the operations.

The subject invention employs a single instancing mechanism that checks the security descriptor of each row in the table (e.g., 204). This single instancing mechanism makes it possible to appear that the system is performing a check across each row. A single instancing of security descriptors across rows can make the check of this mechanism efficient. It will be appreciated that security policies (e.g., access control lists) can be employed in place of the exemplary security descriptors. Therefore, it is to be understood that these additional novel aspects are intended to fall within the scope of this invention and claims appended hereto. Additionally, although ACLs are mentioned above, it is to be understood that other aspects exist that employ disparate security policies. These disparate security policies are intended to fall within the scope of this disclosure and claims appended hereto.

In operation, two tables (202, 204) are maintained—a table of security descriptors 202 and a single instance table of mapping between the hash (e.g., SHA-1) of the security descriptor and a security descriptor identification (SDID). It will be appreciated that this SDID is a unique value. In accordance with the invention, single instancing refers to a mechanism where, for each unique security descriptor in the store, the system maintains a map between the SDID and a hash of the security descriptor.

Therefore, for each row, instead of storing a security descriptor, the SDID that corresponds to it is stored. In one aspect, when a user creates an item, the user has a choice to provide a security descriptor or leave it empty. If left empty, the security descriptor can be inherited from the parent from the item being created. When the user opts to explicitly provide a security descriptor, the system can merge the explicitly defined descriptor with the security descriptor of the parent to create one.

Once a determination is made what the security descriptor on the new item will be, a determination will be made if it already exists. If it does exist, the existing one will be used. If it does not exist, the new one will be saved.

To determine if a security descriptor exists, the invention references the single instance table 204 that includes a mapping of the security descriptor to a hash (e.g., SHA-1 hash) of the security descriptor. Therefore, in order to determine if there exists another item with the same security descriptor, a hash is computed of the subject security descriptor. The system then queries the single instancing table 204 for a row to see if any rows contain the same hash (e.g., SHA-1) of security descriptor. If a match is found, there is a high probability that it exists.

Next, a comparison the actual security descriptor is made to verify if the security descriptor exists. If the actual security descriptor is not the same, the system stores the security descriptor independently. It is to be appreciated that the system only relies upon the hash algorithm (e.g., SHA-1) to guarantee non-uniqueness. In other words, if the hashed value does not match a hashed value in the single instance table 204, a determination can be made that the security descriptor does not exist.

There are three properties to a security descriptor—the hash (mathematically computed value based upon the binary of the security descriptor), the security descriptor itself (binary), and the SDID (integer value that points to the security descriptor). For each row, the system stores the ID of that particular row for which the security descriptor is relevant. Next, in the single instance table 204, the system maps between the hash (e.g., SHA-1) and the SDID. In the security descriptor table 202, the system maps between SDID and binary.

Therefore, the single instance table 204 and the security descriptor table 202 together give a complete mapping from a SHA-1 hash to SDID to binary. Effectively, these two tables (202, 204) can be used to perform a single instancing check.

A security descriptor can have the following logical form:
O:owner_sid
G:group_sid
D:dacl_flags(ace1)(ace2) . . . (acen)
S:sacl_flags(ace1)(ace2) . . . (acen)

In the above example, O: identifies the owner, G: identifies the group, D: identifies the Discretionary Access Control List (DACL) (the section of the security descriptor in the scope of the disclosure) and S: identifies the System Access Control List (SACL). DACL is a collection of Access Control Entries (ACE)—each can take the following form.

ace_type; ace_flags; rights; account_sid

A given principal can be granted or denied access to specific items. Accordingly, the denied items can be implicitly filtered out from the user views. A filtering engine or query component 102 can scan all the items in the store agnostic to any container semantics and produce a uniform set thereby circumventing the limitations of the traversals in the traditional file systems.

The two internal tables (202, 204) can be used to facilitate the storage and access control in the system. In an exemplary aspect, the system can employ a [System.Storage.Store]. [Table!SecurityDescriptorSingleInstance] table 204 (e.g., instance table) and a Sys.security_descriptors table 202 (e.g., security descriptor table). The Sys.security_descriptors table 202 is a catalog view of security descriptors. These descriptors can be created or deleted using data definition language (DDL) primitives provided by SQL Server. The single instance table 204 can key to a central processing unit (CPU) and memory optimizations in the system.

In accordance with an aspect, it can be common that a significant number of items share the same security policy or descriptor. In one example, the maximum size of an access control list (ACL) is 64 KB thus a given security descriptor can be in the order of 128 KB. It will be appreciated that it can be inefficient to store a value of this size with each item given its potentially high degree of commonality. Therefore, each unique security descriptor can be stored in the Sys.security_descriptors table 202 and a mapping between the descriptor and its SHA-1 hash can be maintained in the single instance table 204. As stated previously, a SHA-1 has does not guarantee uniqueness of outputs, but a collision is extremely improbable given its large output range (e.g., $2^{160}$). Since the instance table 204 can have a self-healing nature, it can guarantee that the system can auto recover from corruption or inconsistencies.

Item/Extension/Fragment/Link tables have an entry for the SDID that can be marked with SECURITY attribute. This can ensure that all read access to these tables and any views built on top of these views are subject to an access check requesting (FILE_READ_DATA|FILE_READ_ATTRIBUTES). Rows in the ItemExtension, Link and ItemFragment tables have the same security descriptor as the corresponding row in the Item table.

The mechanism described supra can be considered to be at the core of an authorization model in the read path for emerging file systems. Any authorization model can inherently rely on an authentication model. In one example, when a user connects to the store, the user can be authenticated (e.g., deemed trustworthy) using the preferred operating system authentication mechanisms (e.g., NTLM (NT LAN Manager), Kerberos). The net result of authentication can be a security token representing the user that is accessing the file system. This token can be used subsequently for making authorization decisions for the principal.

In accordance with another aspect of the invention, items secured using row or record level security (RLS) can be protected from the storage service account as well. For security evaluation, the service account can be considered like any other NT-brand account. While this can particularly guarantee uniform security semantics, it brings out interesting problems in the update path. For example, consider a user trying to create an item with a given Namespace name. Namespace names in emerging file systems are guaranteed to be unique in their containing folder, providing an unambiguous naming system. During create operations, the system guarantees this uniqueness by ensuring the non-existence of other items in the same folder with the same namespace name.

In this scenario, an item may already exist in the folder with access permissions denied to the service account. This invention can address this problem by using a signature mechanism. Update primitives that require global access to the store can be signed with certificates that are granted "exempt RLS" privilege. From within the context of such a primitive, the system can query the store and row level security will be bypassed in this case.

As described supra, traditional file systems have made a distinction between attributes and data for enabling the traversal semantics. The lack of discoverability and query-based semantics induced a model where attributes and data are distinguished for access control decisions. The subject invention provides seamless access to data and attributes by facilitating all or nothing semantics on the type system.

Following is a detailed discussion of an exemplary file system security model. The discussion that follows describes component functionality in a number of disparate scenarios. It is to be appreciated that these described scenarios are provided merely to provide context to the invention and are not intended to limit the invention, or claims appended hereto, in any way.

Referring first to the file system security model, in one aspect, data can be organized in a store as an "item" which can refer to the smallest unit of consistency in file system. An "item" can be independently secured, serialized, synchronized, copied, backed-up/restored, etc. It will be appreciated that a file system item can be described as an instance of a type whose ancestor is the type System.Storage.Item, which is an entity type. All items in file system can be stored in a single global extent of items. As well, each item can have a unique identifier which is guaranteed to be unique for all items in a given file system store.

Figure 3:
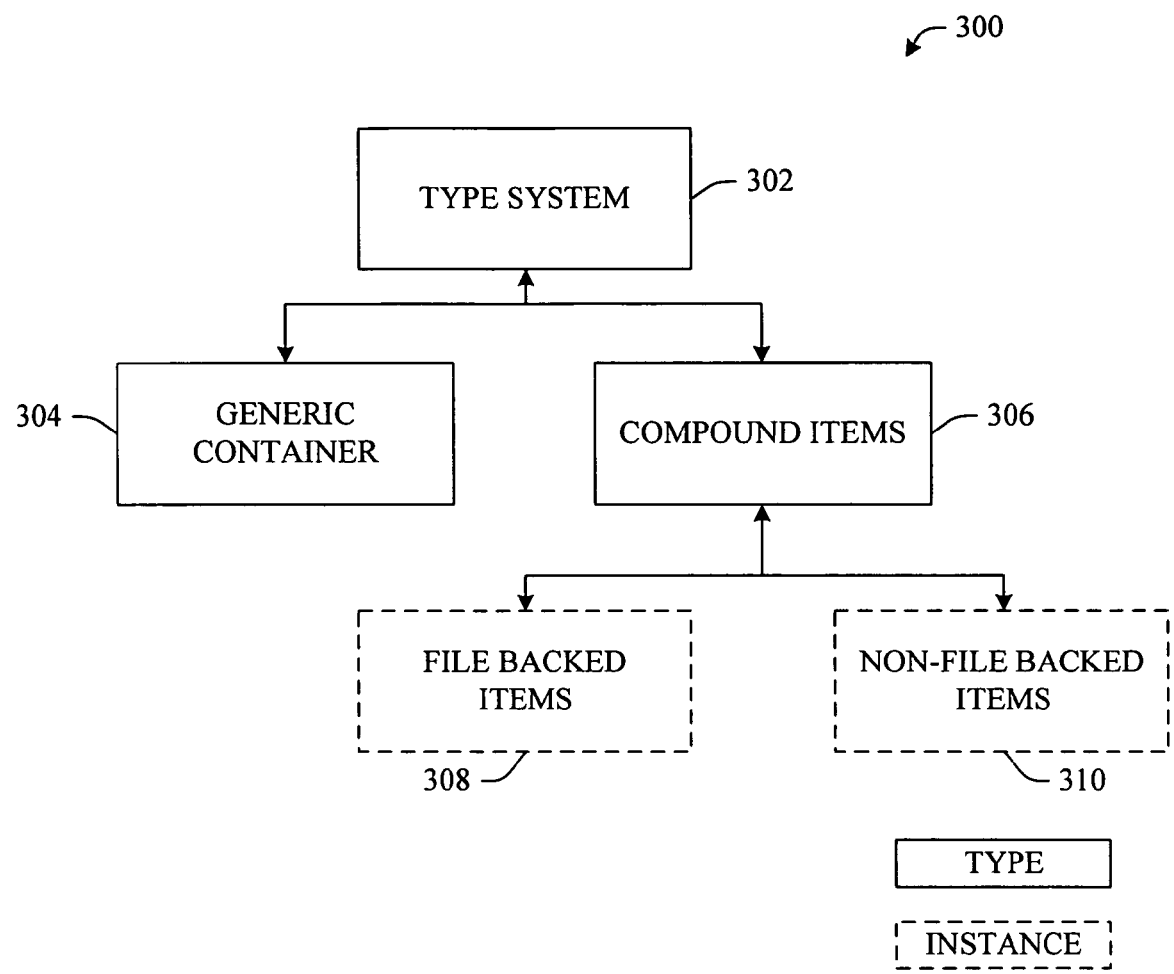
FIG. 3 illustrates a system that classifies items in a type system as instances of generic container types and compound item types in accordance with an aspect.

Referring now to FIG. 3, a system 300 is shown. System 300 is in accordance with the context of this security discussion whereas items in a type system 302 can be classified as instances of generic container types 304 and compound item types 306. Generic containers 304 can be used to model folders and any other hierarchical data collection buckets. Compound item types 306 can be used to model a single logical unit of data for an application. Instances of this type can give all or nothing semantics for typical data operations like copy, move, sync etc. Examples of the latter include, but are not limited to, mail messages, pictures, contacts, etc. Instances (denoted by dashed lines) of compound item types 306 can be further classified as file backed items 308 (FBIs) and non-file backed items 310 (nFBIs). It will be appreciated that a Win32-brand access is semantically limited to FBIs and generic containers.

The following containment hierarchy (e.g., tree-like structure) applies to the items. Generic containers 304 and compound items 306 can contain any other item types including generic containers. Items within these additional generic containers can also be independently secured. FBIs 308 can not contain other items and hence form leaf nodes in the hierarchy.

Figure 4:
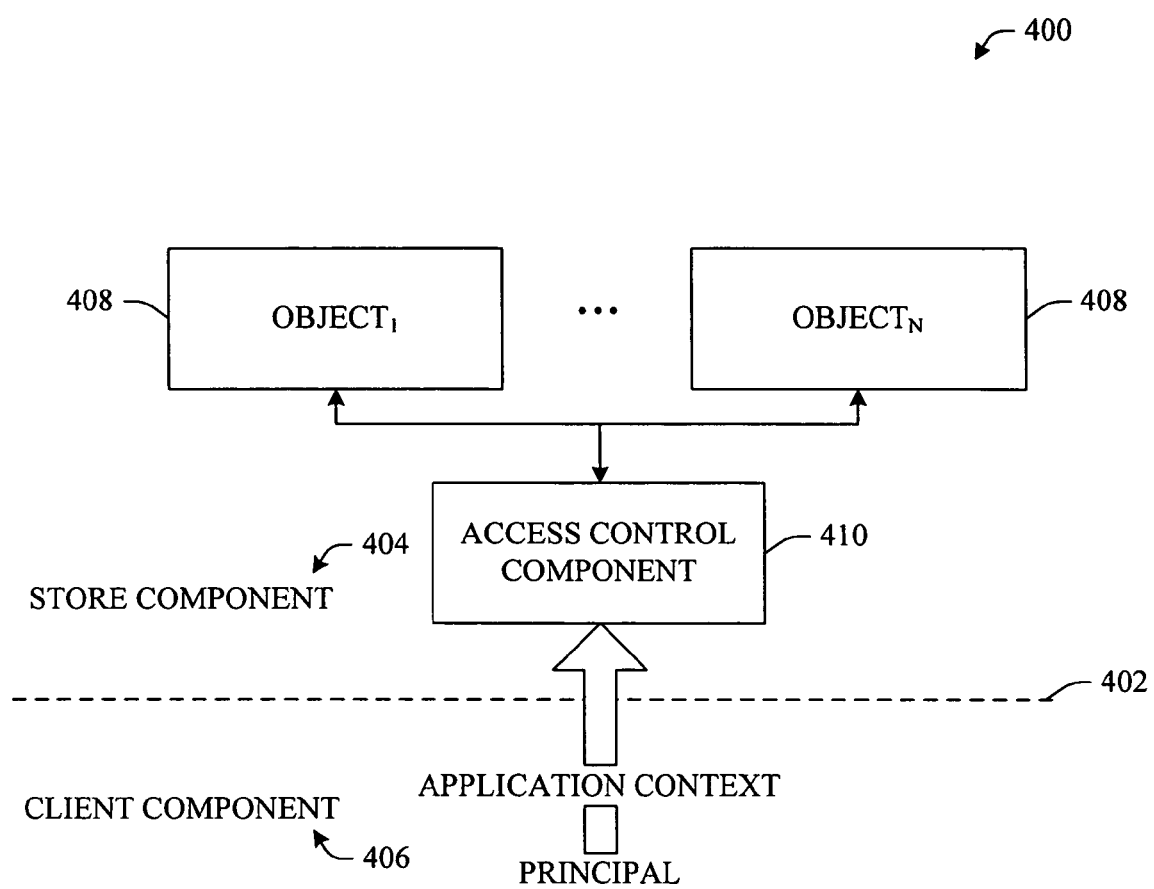
FIG. 4 illustrates a block diagram of a system having a store component and a client component on opposite sides of a trust boundary in accordance with an aspect of the invention.

Referring now to FIG. 4, it will be appreciated that a file system 400 can include two major components on opposite sides of a trust boundary 402—a store component 404 and a client component 406. As illustrated, store component 404 can include 1 to N object components, where N is an integer. Object components 1 to N can be referred to individually or collectively as object components 408. The store component 404 that deals with storage and retrieval of the object 408 can form a trusted file system subsystem between the store component 404 and the client component 406.

The client component 406 which can provide programming semantics to the platform usually runs in the user processes. It will be understood that the users can be authenticated at connection time. Retrieved objects 408 (e.g., items) can be materialized in the client space. In one aspect, no security checks or access constraints are enforced by the client on these objects 408. In accordance with the invention, the store component 404 can enforce access control (via access control component 410) when the programming context is persisted to the store component 404. Following is a discussion of user authentication.

File system 400 can expose the notion of a security principal that can perform actions against the items 408 contained in a file system store 404. In aspects of the invention, a security principal could be a user or a security group. Accordingly, the security principal can be represented by a security identifier (SID).

As illustrated in FIG. 4, a connection to the file system service is in the context of a security principal that is successfully authenticated by the access control component 410. It will be understood that file system authentication (e.g., via access control component 410) can be a derivative of the operating system authentication mechanism. For example, a file system authentication can be a derivative of a Windows-brand authentication available in the SQL (structured query language) security model. For example, it will be appreciated that SQL offers another built-in authentication mechanism called SQL authentication which may not be supported in file system 400.

Continuing with the example, an attempted connection by a Windows-brand user can be authenticated by the file system 400 while leveraging Windows-brand provided authentication services such as Kerberos, NTLM, etc. In the example, an authenticated user is mapped to a "public" role in SQL which is used for authorization decisions in the store 404. In one aspect, a built-in administrator (BA) will be mapped to SQL administrators granting SQL administrative privileges to the BA. In an alternative aspect, file system administration can be solely built using file system primitives. As such, BA would not be a member of the SQL administrators in the alternative aspect.

The net result of the authentication is a security token that represents the principal that accesses the file system 400. This data structure can include the SID of the incoming principal as well as the SID's of all the groups for which the principal is a member. In addition, all privileges held by the user can be, by default, enabled while connecting to file system 400. As will be better understood following the discussion below, this token can be subsequently used to make authorization decisions.

Turning now to a discussion of authorization, as described supra, file system authorization can be built on share level security and item level security. As used in this description, a "share" can refer to an alias to an item 408 in the store 410. When a store 410 is created, a default share is created aliased to the root item. Users with sufficient privilege can create shares aliased to any generic container (e.g., item 408) in the store 410.

The file system can use universal naming convention paths to expose namespace locally and remotely. Hence file system clients connect to a share whereby the connection point together with the relative hierarchy of names constitutes the addressing mechanism to file system objects 408.

By way of example, suppose a user connects to a root share to access foo. Accordingly, the access would appear as \\MachineName\StoreName\RootShare\ . . . \foo. Similarly, the user connected to a share called AliceShare would access the same object as \\MachineName\AliceShare\ . . . \foo. In this example, the effective permission on the item can be a function of the security descriptor on the connected share and the item. It is to be understood that the former defines a share level security and the latter defines an item level security. Details on each of these security mechanisms as well as rules for composing the effective security descriptors are described infra.

Beginning with a discussion of the share level security, file system shares in accordance with the invention are somewhat akin to Windows-brand shares. In order to provide uniform semantics over local and remote access, for every file system share created, a mirroring share can be created as well. Shares can be stored as items in a catalog store and can be securable using item security which is the topic that follows. Permissions on these items and on the shares can be the same granting uniform access semantics on both local and remote access.

Default permissions can be granted as desired with respect to items. For example, disparate items in a share can have different default permissions applied with respect to user characteristics (e.g., local system built-in administrator, authenticated, interactive . . . ).

Similar to Windows-brand shares, the default values for the share security descriptor are configurable using the registry setting at LanManServer\Default Security\SrvsvcDefaultShareInfo.

Item security mechanisms can employ security descriptors to effect access control. Accordingly, in one aspect, a security descriptor can be communicated by APIs (application program interfaces) in a security descriptor definition language string format and stored in the database in a packed binary format under the VARBINARY column of Sys.Security_Descriptors, the security descriptor table (202 of FIG. 2).

A new security descriptor table, 202 of FIG. 2 as described supra, Sys.Security_Descriptors, exists to hold each unique Security Descriptor, stored as a packed binary security descriptor with a unique ID (SDID) for use as a foreign key in file system base tables. For example, a security descriptor table can appear as follows:

| SDID | SecurityDescriptor VARBINARY |
|------|------------------------------|
| 55   | XXXXXXXXXX                   |
| 56   | XXXXXXXXXX                   |

Although the security descriptor table above employs a binary representation for the security descriptor, it is to be appreciated that any suitable representation can be employed without departing from the spirit and scope of the invention and claims appended hereto.

Referring now to a discussion of representation and storage of security descriptors and related data, as described supra, the invention employs two internal tables that can hold security descriptor related information—a security descriptor table (e.g., sys.security_descriptors and a single instance table (e.g., [System.Storage.Store].[Table!SecurityDescriptorSingleInstance]).

Continuing with the example, Sys.security_descriptors is a catalog view maintained by SQL. This binary is stored in a corresponding row with the SDID.

The single instance table can be maintained by the file system. It contains a map of a hash of the binary security descriptor to the SDID identified in the aforementioned Sys.security_descriptors view or table. In one example, a SHA-1 hash can be employed. In one aspect, if multiple items with the same security descriptors are created, a single entry can exist in both the tables.

As stated above, another novel feature of the invention is that if the single instance table is ever corrupted, it can be destroyed as it is a self-healing table. In other words, if a corruption were to occur, a new table can be created merely by generating new hash values and associating them to the appropriate SDID.

In an aspect, Item/Extension/Fragment/Link tables can have an entry for the SDID that is marked with "security" attribute. It will be understood that this can ensure that any read access to these tables and any views built on top of these views could be subject to an access check asking for (FILE_READ_DATA|FILE_READ_ATTRIBUTES). It will further be understood that the ItemExtension, Link and ItemFragment table must have the same security descriptor table as the Item table.

Figure 5:
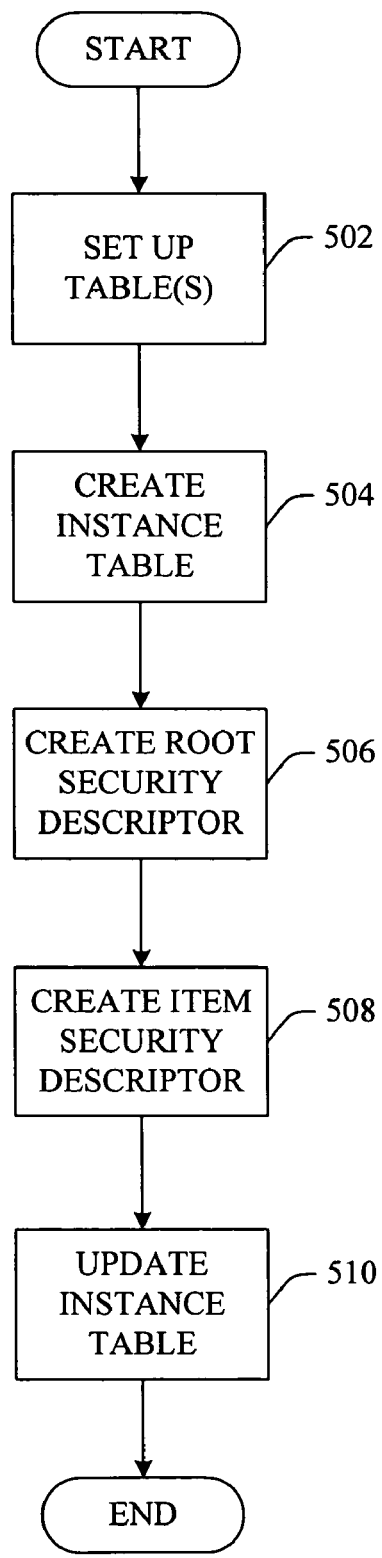
FIG. 5 illustrates a methodology of initialization in accordance with an aspect of the invention.

FIG. 5 illustrates a methodology of initialization in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

While building a model database during the build process security data structures are initialized. At 502, tables are set up. In one example, setting up tables can include setting up Sys.server_principals, Sys.database_principals, Sys.server_role_members and Sys.database_role_members. At 504, a single instance table is created. In accordance with our example, [System.Storage.Store].[Table!SecurityDescriptorSingleInstance] can be created at 504.

At 506 a root security descriptor is created. This root security descriptor corresponds to the root of the store (e.g., administrators have full control). At 508, item level security descriptors are created. For example, at 508, security descriptors for tombstone items can be created such that administrators have full control and authenticated users have read access. At 510, these entries are added to the single instance table.

The file system can support inheritance of ACLs. For example, from the time of item creation (e.g., CreateItem or CreateComplexItems), the security descriptor for the item can be computed using the supplied security descriptor (if any), the parent security descriptor, the type of item and the token (e.g., NT-brand token) of the caller.

Referring now to a discussion of access checks, all update APIs perform appropriate access checks by calling [System.Storage.Store].[HasSecurityAccess]. The API ensures that the caller is granted the request permission bit both at the share level as well as the security descriptor (e.g., item, record) level. In one specific aspect, the access check performed on the security descriptor (of the parent) is different (FILE_DELETE_CHILD) from the one (DELETE) performed on the share. For other cases, the two access checks can be consistent.

Continuing with the example, ACL propagation throughout the tree-like structure can be performed when SetItemSecurity (with a new DACL or SACL) or MoveItem with a new parent is called. After the appropriate access checks are performed to ensure that the caller is allowed to perform the operation, ACL propagation can be effected in the context of File system. No access checks are done on the subtree-like structure for which ACLs are updated.

It is to be appreciated that the invention can employ asynchronous and/or synchronous propagation. Following is a discussion of synchronous propagation. It is to be understood that the root of the subtree-like structure has nothing to do with Compound items. Rather, the root of the subtree-like structure is a generic term to describe the node on which SetItemSecurity or MoveItem is called.

In accordance with synchronous propagation, the new security descriptor for the root item is computed. If DACL or SACL are not updated, the SDID if updated for the item, extension, fragment and link tables and the system returns. The entire item subtree-like structure is locked starting at the item. In the example, it is not necessary to lock any other table (Extension, Fragment, Link).

Next, a temporary table that contains all the items in the act above can be created. The temporary table can have the following characteristics. The temporary table can have ContainerId, ItemId, and NewSdId. As well, initially, NewSdId can be NULL for all but the root of the subtree-like structure.

For each entry in the temporary table, the new SD can be computed using the new parent SD, the type of the item and the existing item SD. In the example, CreatePrivateObjectSecurityEx(SEF_AVOID_PRIVILEGE_CHECK|SEF_AVOID_OWNER_CHECK) can be used. Accordingly, the temporary table can be traversed level by level each time processing those rows whose new parent SD has been computed and the new SDID for the item is NULL. In accordance with the example, this walks the table one level at a time.

The number of iterations is O (e.g., depth of the tree-like structure). Two issues can be considered. First, computation of new security descriptors can be considered. Second, update of security descriptors on all children can be considered. In the second scenario, the theoretical limit is O (e.g., number of children). In the first scenario, although not necessary, it is usually O (depth of the tree). If needed, a new Security Descriptor can be created (e.g., in the single instance and Sys.security_descriptors tables). Next, the temporary SDID table is updated in the temporary table. Finally, Item, Extension, Link and Fragment table can be updated using the data computed in temporary table.

Figure 6:
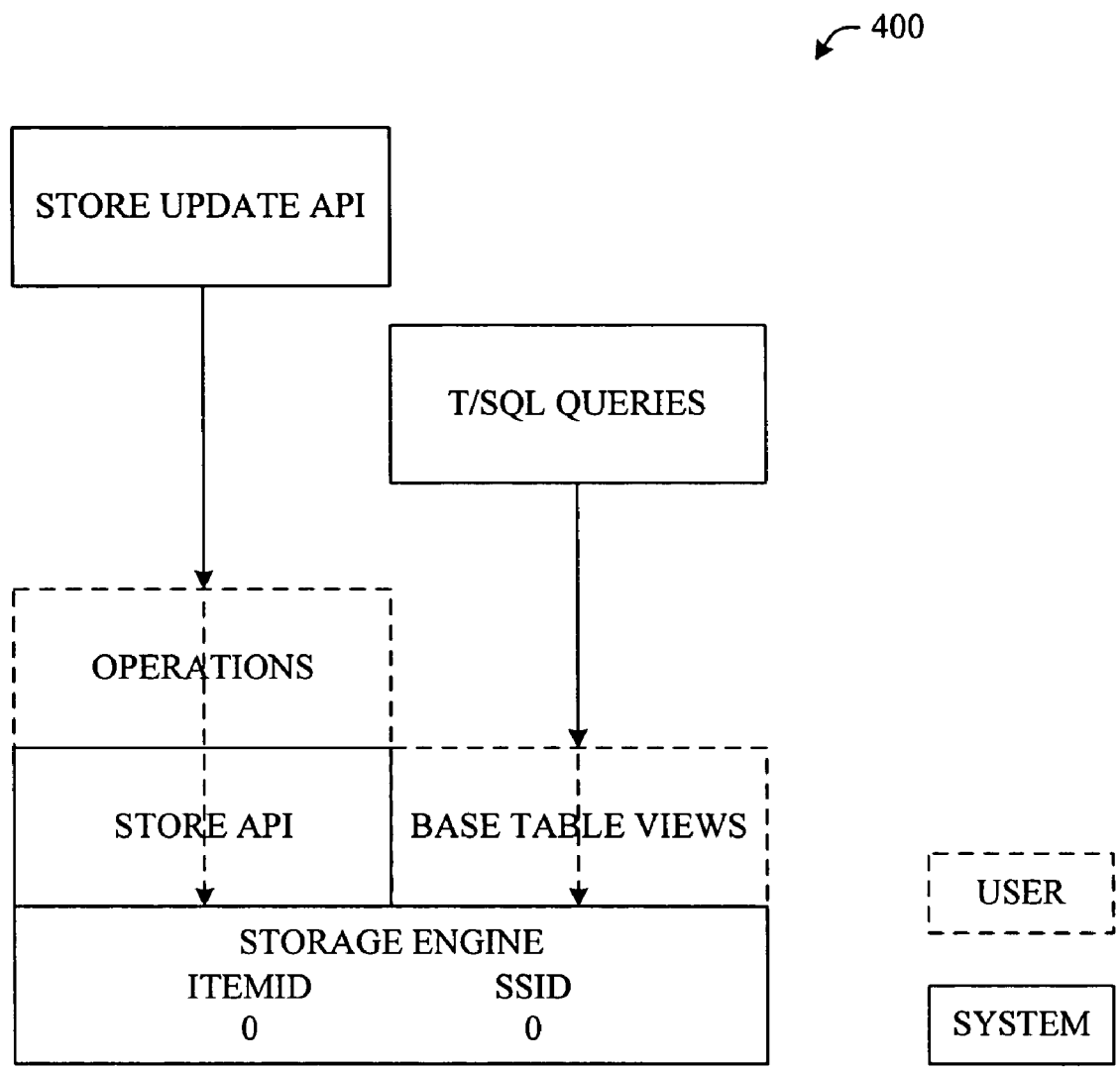
FIG. 6 is a relational diagram illustrating that operations which query the views can operate in the user context where access control for selection statements can be enforced by row level security in accordance with an aspect of the invention.

FIG. 6 illustrates that T/SQL Operations which query the Master Table Views operate in the User Context where Access Control for SELECT statements is enforced by Row Level Security. Additionally, calls to the File system Store Update API are made in the User Context but executed in the System Context. The implementation can therefore enforce permission checks for the caller.

Figure 7:
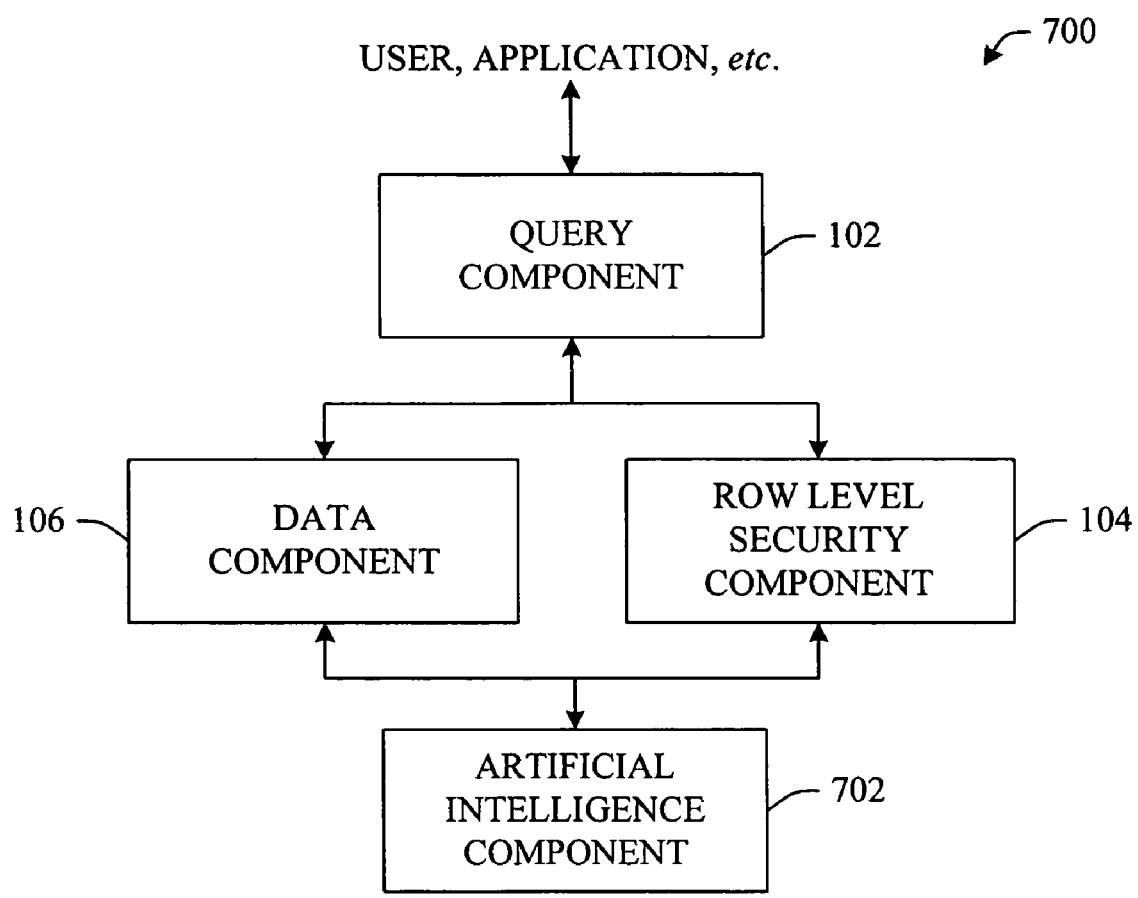
FIG. 7 is a block diagram of a system that employs artificial intelligence-based mechanisms in accordance with an aspect of the invention.

FIG. 7 illustrates a system 700 that employs artificial intelligence (AI) which facilitates automating one or more features in accordance with the subject invention. The subject invention (e.g., in connection with implementing security policies) can employ various AI-based schemes for carrying out various aspects thereof. For example, a process for determining if a security descriptor should be set and, if so, the level of security to employ can be facilitated via an automatic classifier system and process. Moreover, where the single instance and security descriptor tables (202, 204 from FIG. 2) are remotely located in multiple locations, the classifier can be employed to determine which location will be selected for comparison.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria.

Figure 8:
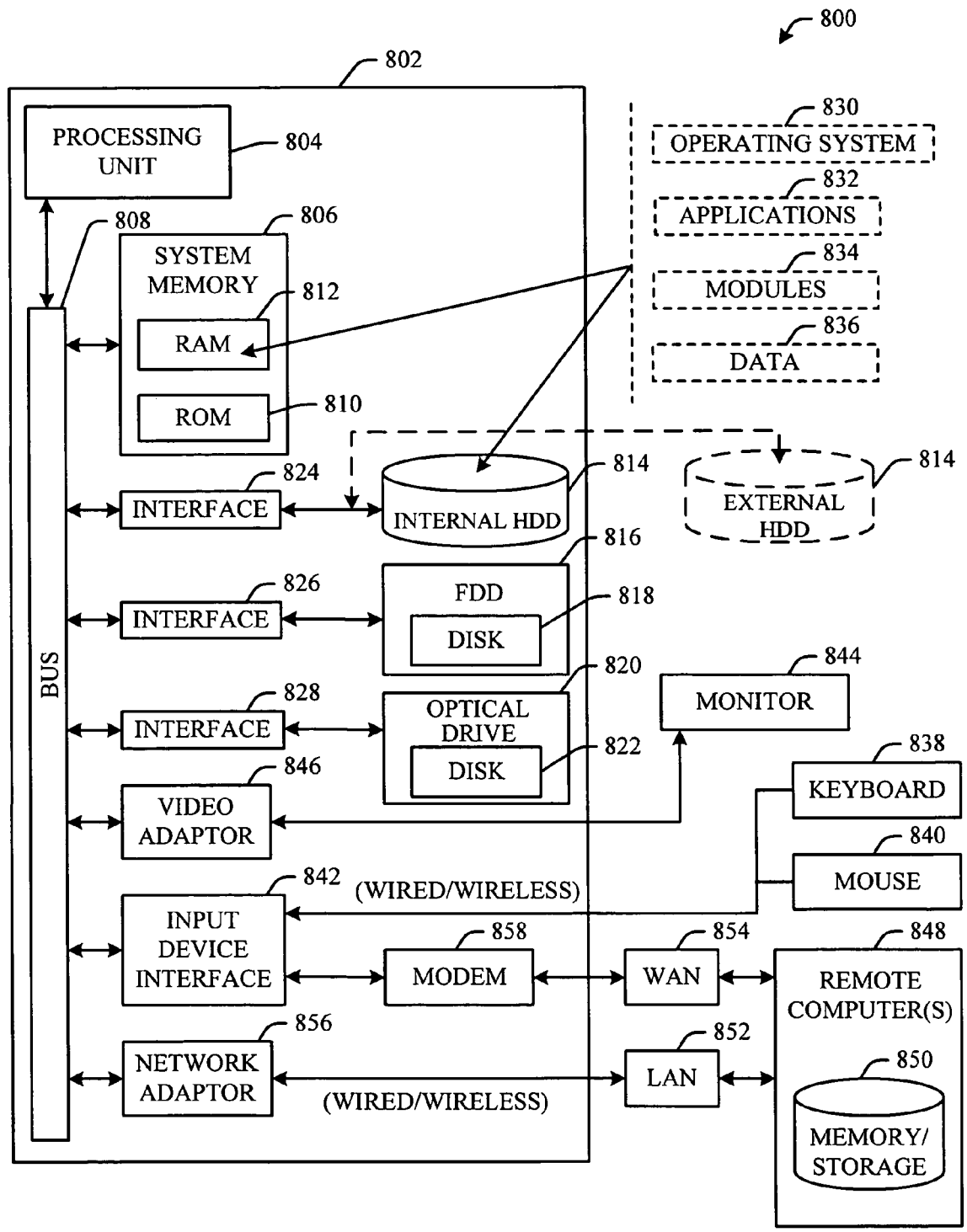
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the subject invention, FIG. 8 and the following discussion are intended to provide a brief, general description of a suitable computing environment 800 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the invention includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
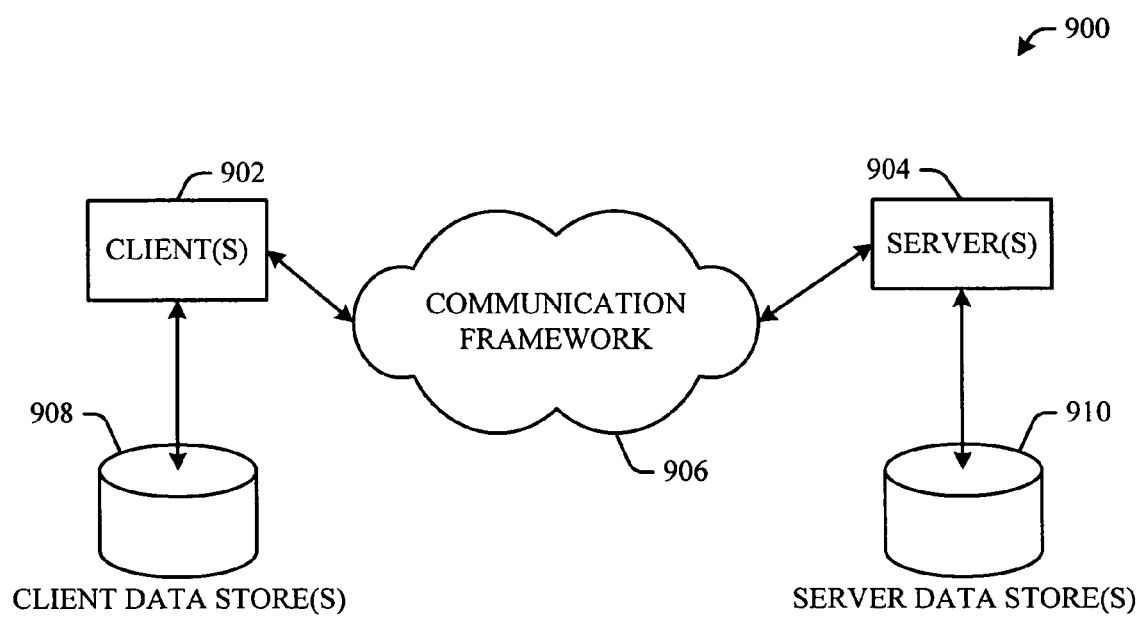
FIG. 9 illustrates a schematic block diagram of an exemplary computing environment in accordance with the subject invention.

Referring now to FIG. 9, there is illustrated a schematic block diagram of an exemplary computing environment 900 in accordance with the subject invention. The system 900 includes one or more client(s) 902. The client(s) 902 can be hardware and/or software (e.g., threads, processes, computing devices). The client(s) 902 can house cookie(s) and/or associated contextual information by employing the invention, for example.

The system 900 also includes one or more server(s) 904. The server(s) 904 can also be hardware and/or software (e.g., threads, processes, computing devices). The servers 904 can house threads to perform transformations by employing the invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904. What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates accessing data, comprising:
a computer processor that executes the following software components;
a query component that generates an abstraction of a data store from a connection point;
a row-level security component that limits the abstraction based upon at least one row-level access permission, associates a security policy with at least one row in a data store, and comprises a security descriptor table that maps a security descriptor to a security descriptor identifier (SDID); and a single instance table that maps the SDID to a hash value of the SDID, such that the single instance table and the security descriptor table together give a complete mapping from a SHA-1 hash algorithm to SDID to binary, and the tables are used to perform a single instancing check; and
a component that determines if propagation is appropriate and, if necessary, sets the security policy in a root of a hierarchical organization and propagates the security policy to at least one child in the hierarchy; and
wherein the SDID is stored for each row of the data store, such that when a user creates an item, the security descriptor is inherited from a parent in the hierarchy.

2. The system of claim 1, the data store is organized in a hierarchy and the query component transcends the hierarchy.

3. The system of claim 1, further comprising a component that provides a trustworthy identity establishment system used in connection with an access control enforcement policy.

4. The system of claim 1, further comprising a rendering component that renders the limited abstraction.

5. The system of claim 1, the row-level security component associates a security policy with at least one row in the data store.

6. The system of claim 5, each row in the data store contains a single object.

7. The system of claim 6, the security policy is at least one of an access control list (ACL) and a security descriptor.

8. The system of claim 7, the object is at least one of a data element and a container organized in a hierarchical organization.

9. The system of claim 8, the component that propagates the security policy intelligently uses a security descriptor of a parent and the object to compute an effective security descriptor for the object.

10. The system of claim 1, the SDID is an integer value that points to the security descriptor.

11. The system of claim 1, the hash value is generated via a SHA-1 hash algorithm.

12. The system of claim 1, further comprising an artificial intelligence (AI) component that employs a probabilistic and/or statistical-based analysis to prognose or infer an action that a user desires to be automatically performed.

13. A method for providing access control to data in a data store, comprising:
organizing the data into a hierarchical organization;
transcending the hierarchical organization;
setting a security policy in a root of the hierarchical organization;

intelligently propagating the security policy to at least one child in the hierarchical organization based at least in part on a parent security descriptor;
generating a connection point abstraction of the data store;
applying a row-level security policy to limit the abstraction to a subset of the data based at least in part on the row-level security policy, the row-level security policy associates at least one of an ACL and a security descriptor with at least one row in the data store;
mapping a security descriptor to a security descriptor identifier (SDID);
mapping the SDID to a hash value of the SDID, such that a complete mapping from a SHA-1 hash algorithm to SDID to binary is conducted and used to perform a single instancing check;
storing the SDID for each row of the data store, such that when a user creates an item, the security descriptor is inherited from a parent in the hierarchy; and
rendering the limited abstraction via a display to a user.

14. The method of claim 13, further comprising establishing a trustworthy identity establishment system used in connection with applying the row-level security policy.

15. A system that facilitates access control of data in a data store, comprising:
means for organizing the data into a tree-like structure;
means for transcending the tree-like structure;
means for setting a security policy in a root of the tree-like structure;
means for intelligently propagating the security policy to at least one child in the tree-like structure;
means for applying the propagated security policy based at least in part on a security policy of a parent and a security policy of the child;
means for filtering a connection point abstraction of the data store based at least in part on one or more security policies, the one or more security policies associate with at least one row in the data store;
means for mapping a security descriptor to a security descriptor identifier (SDID);
means for mapping the SDID to a hash value of the SDID, such that a complete mapping from a SHA-1 hash algorithm to SDID to binary is conducted and used to perform a single instancing check;
means for storing the SDID for each row of the data store, such that when a user creates an item, the security descriptor is inherited from a parent in the hierarchy; and
means for rendering the limited abstraction via a display to a user.

16. The system of claim 15, further comprising:
means for establishing a trustworthy identity establishment system used in connection with applying the row-level security policy.

\* \* \* \* \*